United States Patent
Frank (10) Patent No.: US 9,234,548 B2
(45) Date of Patent: Jan. 12, 2016

(54) BEARING ARRANGEMENTS AND INTEGRATED COOLING AND/OR HEATING DEVICES AND METHOD FOR INTEGRATED HEATING OR COOLING

(75) Inventor: Hubertus Frank, Höchstadt (DE)

(73) Assignee: IMO Holding GmbH, Gremsdorf, DE (US)

( * ) Notice: Subject to any disclaimer, the term of this patent is extended or adjusted under 35 U.S.C. 154(b) by 0 days.

(21) Appl. No.: 13/880,925

(22) PCT Filed: Oct. 20, 2011

(86) PCT No.: PCT/EP2011/068368
§ 371 (c)(1),
(2), (4) Date: Jul. 9, 2013

(87) PCT Pub. No.: WO2012/052521
PCT Pub. Date: Apr. 26, 2012

(65) Prior Publication Data
US 2013/0287328 A1   Oct. 31, 2013

(30) Foreign Application Priority Data
Oct. 21, 2010 (DE) .......................... 10 2010 049 953

(51) Int. Cl.
*F16C 37/00* (2006.01)
*F16C 33/58* (2006.01)

(52) U.S. Cl.
CPC ............... *F16C 37/007* (2013.01); *F16C 33/58* (2013.01); *F16C 2300/14* (2013.01); *F16C 2360/31* (2013.01)

(58) Field of Classification Search
CPC ............................... F16C 37/00; F16C 37/007
USPC .................................. 384/467, 476, 900, 905
See application file for complete search history.

(56) References Cited

U.S. PATENT DOCUMENTS

| 3,097,027 A * | 7/1963 | Mims et al. ................... 384/476 |
| 4,948,269 A | 8/1990 | Hamilton |
| 2008/0298733 A1 * | 12/2008 | Glueck ......................... 384/476 |

FOREIGN PATENT DOCUMENTS

| DE | 2021156 | 4/1971 |
| DE | 4234303 | 4/1994 |
| DE | 102004015176 | 10/2005 |
| DE | 102005058141 | 7/2007 |
| DE | 102007029571 | 11/2008 |
| DE | 102008052287 | 4/2010 |
| WO | WO 99/35414 | 7/1999 |
| WO | WO 2004/104434 | 12/2004 |
| WO | WO 2007/065412 | 6/2007 |

* cited by examiner

*Primary Examiner* — Phillip A Johnson
(74) *Attorney, Agent, or Firm* — Pandiscio & Pandiscio (57) ABSTRACT

A bearing arrangement comprising mutually rotatable components, and devices for integrated heating and cooling of rolling-element raceways, or of mutually rotatable components, and a method for integrated heating or cooling applicable to the mutually rotatable components, and devices for integrated heating or cooling of the components and rolling-element raceways wherein the respective heating and/or cooling is effected by direct heat input into the components, or direct heat removal from the components, and is controllable, and is produced by the interaction of cold- or heat-producing elements, or functions or devices, and is adapted to switch between a heating effect and a cooling effect.

17 Claims, 6 Drawing Sheets

BEARING ARRANGEMENTS AND INTEGRATED COOLING AND/OR HEATING DEVICES AND METHOD FOR INTEGRATED HEATING OR COOLING

BACKGROUND OF THE INVENTION

1. Field of the Invention

The invention relates to a bearing arrangement in the form of a bearing, large rolling bearing, or rotary joint, with devices for integrated cooling and/or heating, and to a method for the integrated heating or cooling of a bearing, large rolling bearing, slew drive, or rotary joint.

2. Description of the Prior Art

Currently available and currently used large rolling bearings, bearings, and universal rotary joints for machine and plant engineering, and which can be used in slew drives to prevent excessive cooling of bearing components—especially the stressed components in and around the raceways of the rotary joint(s)—are cooled with a liquid or an oil. Technical solutions also exist in which the bearing components, especially the stressed components, are heated by means of a liquid or an oil, or by an electrical heating system.

Such large rolling bearings, bearings, and universal rotary joints, for machine and plant engineering, are also often used in applications of this kind that involve sharp temperature fluctuations and/or extreme operating conditions. Specifically, such parts are commonly used in wind power plants, cranes, ship cranes, tunnel construction, and all other conceivable areas of application. Regardless of circumstances, large rolling bearings, bearings and universal rotary joints for machine and plant engineering, are likely to be exposed to extreme temperature and environmental conditions, and thus also extreme heat or cold.

DE 102005058141 A1 and the related WO 2007/065412 A1 relate to a rolling bearing having at least one heated rolling-bearing ring, such that an electric heating element is mounted in thermally well-conducting contact on a surface portion of the heated rolling-bearing ring; the amount of heat that can be generated by the heating element is provided such that the heated rolling-bearing ring undergoes thermal expansion when heated. The expansion makes it possible to install the rolling bearing on a frame element so that a shrink fit is created as it subsequently cools.

DE 102008052287 A1 relates to a bearing arrangement comprising
a bearing through which a medium (particularly water) flows and a filter device, which is disposed upstream from the bearing to remove particles from the medium, and a shaft received in the bearing, such that a feed device for the medium is disposed downstream from the bearing and controls the flow of the medium through the bearing.

Other examples of the prior art are the documents DE 2021156 B2, WO 99/35414, DE 4234303 A1 and DE 102004015176 A1, which also describe cooling systems for bearings.

The term "passive or indirect cooling" generally applies when indirect cooling is present, as in the case, for example, of the heat pipe principle, or the convection heating principle. A heat pipe generally functions as a heat transfer device that uses the heat of evaporation of a substance to achieve a high heat flux density, that is, large quantities of heat can be transported through a small cross-sectional area.

The waste heat present in a given part is emitted to the ambient air by the principle of thermal convection, for example via cooling fins, radiators, etc.

To summarize, the technical solutions of the current state of the art, as represented by the above-cited documents, often have the major disadvantage of having been developed either in the context of heating, or in the context of cooling, of components of the bearing arrangement.

Until now, grease-lubricated rotary joints, in particular, have not lent themselves well to direct, active cooling or direct, active heating. Usually, the only solution open to the skilled person is indirect cooling, which is inadequate. At very low temperatures (about −40° C. and below), grease in the bearing is stiff and hinders the operation of the bearing, or the start-up of the installation. At very high temperatures, on the other hand, the oil in the grease becomes low-viscosity, which has a negative effect on the lubricant. Both too-low and too-high temperatures prematurely reduce the quality of the lubricant, so it has to be replaced sooner than normal.

SUMMARY OF THE INVENTION

Taking the foregoing into consideration, it is desirable to provide an inventive system by means of which, even in the case of grease lubrication, the heat is transported directly, quickly and efficiently out of the bearing, preferably by active cooling. The same system should also be designed so that the bearing, or large rolling bearing, or rotary joint, or slew drive, can be heated quickly and efficiently in a manner consistent with active heating. The solution is achieved by means of the present invention.

The bearing arrangement embodied by the invention comprises at least two substantially annular components, which are rotatable relative to each other about an axis of rotation; a plurality of rolling elements, which are disposed between the substantially annular components and brace them apart on rotation of the substantially annular components relative to each other; devices for heating and/or cooling at least one of the substantially annular components and/or the plurality of rolling elements; and a controlling and/or regulating device for controlling and/or regulating the heating and/or cooling, which makes it possible to switch between heating and cooling; wherein the devices for heating and/or cooling permit active heat supply and/or heat removal to and/or from at least one of the substantially annular components and/or the plurality of rolling elements.

A bearing arrangement configured in this way makes it possible to adjust the operating temperature, at least of the parts of the bearing arrangement that are relevant to movement, regardless of the ambient temperature. The wear and reliability characteristics of the bearing arrangement are improved, as are the start-up characteristics of the bearing arrangement, for example from a complete stop at low or high temperatures.

In one embodiment of the invention, at least one material recess is provided, at least in sections, in the circumferential direction in at least one annular component, and forms at least one section of a flow channel through which a heat exchange medium, particularly water, oil, coolant, or a low-flammability gas, can be routed, wherein one or more walls of the flow channel function as a heat transfer surface for exchanging heat between the at least one annular component and the heat exchange medium.

The formation of a material recess at one or more of the annular components results in a flow channel through which the heat exchange medium can flow. In this way, the heat exchange medium can be disposed very close to the raceways of the rolling bearing, that is, in the immediate vicinity of the location where the heat is generated.

In a further embodiment of the invention, at least one or more, preferably three, material recess(es) are provided substantially fully circumferentially in the circumferential direction of at least one annular component, preferably such that a plurality of substantially parallel, preferably concentric, material recesses are present substantially fully circumferentially. The heating or cooling capacity is greater with a higher number of material recesses through which heat exchange medium can be routed. It is, of course, conceivable for these material recesses to extend around the axis of rotation in a spiral shape, thus providing a longer flow channel whose length is greater than the extent of the outer radius of the bearing arrangement, it particularly being a multiple of the outer radius of the bearing arrangement.

In a further configuration of the invention, at least one, preferably a plurality of, material recess(es) are present, at least in sections, in the axial direction in at least one annular component, and form at least one section of a flow channel, particularly such that the at least one material recess in the axial direction is in fluidic connection with at least one material recess in the circumferential direction.

This type of configuration for the bearing arrangement makes it possible to incorporate the necessary material recesses during the production of the individual parts, with the result that the flow channel, with all the necessary fluidic connections, is formed during the assembly of the individual parts.

In a further embodiment of the invention, an upper punched disk and/or a lower punched disk are fixed to the at least one annular component and form upper flow chambers and/or lower flow chambers, particularly in such fashion that the upper flow chambers and/or the lower flow chambers fluidically connect to one another in the circumferential direction a plurality of material recesses arranged in the axial direction, preferably in such a way that a meander-shaped or serpentine-shaped flow channel is formed.

Configuring the flow channel, or channels, with a meander-shaped or serpentine-shaped shape makes it possible to convey the heat exchange medium along the largest possible area of the annular components. The heating or cooling effect of the heat exchange medium can be increased in this way.

The bearing arrangement can also include at least one upper sealing device, particularly an upper sealing plate, and/or at least one lower sealing device, particularly a lower sealing plate, which are fixed to the at least one annular component and/or at least one jacket-shaped part fixed to the at least one annular component, wherein the upper sealing plate, and/or the lower sealing plate, and/or the jacket-shaped part, form, preferably by means of sealing elements, a fluidic boundary of the flow channel with respect to the environment, particularly such that the upper sealing plate, and/or the lower sealing plate, and/or the jacket-shaped part, comprise at least one filling device, preferably at least one filling bore, through which heat exchange medium can be fed to, and discharged from, the flow channel.

The use of sealing plates permits fluid-tight isolation of the flow channel from the environment. Particularly important is the provision of a filling device that is configured as well-sealing and permits secure filling.

Devices for heating and/or cooling can also include elements for heating and/or cooling, particularly heating filaments, thermoelectric converters and/or Peltier elements, in which case the elements can be disposed at walls of the axial or circumferential-direction material recesses and/or at, or near, the raceway for the rolling elements.

Heating filaments, thermoelectric converters, and Peltier elements can be very well regulated and controlled, so a desired temperature can be set very precisely.

In addition, it can be made possible for the controlling and/or regulating device to adjust the temperature of at least one annular component to a desired operating temperature as a function of the ambient temperature, preferably to an operating temperature adapted to a predetermined favorable temperature of a lubricant used.

It is especially favorable to the operation of the bearing arrangement, if the temperature of the bearing arrangement and that of the lubricant are adjusted, at the beginning of, and during, operation, to make optimal use of the lubricating effect of the lubricant.

In a further development of the bearing arrangement, the heat exchange medium can be routed through the flow channel in a preferred flow direction, in which case the controlling and/or regulating device is able to change the preferred flow direction.

Reversing the preferred flow direction makes it possible to set the temperature particularly uniformly over the entire extent of the annular components.

To summarize, during operation, the arrangement (bearing, or large rolling bearing, or rotary joint, or slew drive) is protected against exposure to temperatures that are too high or too low. In particular, the system according to the invention, and the rational wiring thereof, ensures that no excessively high or low temperatures will prevail, even when the installation is being started. The active heating/cooling can be backed up with indirectly (passively) cooling or heating measures, devices and functions. The present invention is a particularly good means of palliating all the disadvantages cited above.

These essential elements for cooling/heating are integrated into the arrangement, for example, into the rotary joints and/or the slew drive. The cooling/heating means can also be such as to provide active heating or cooling of media, in which case the flow of heat exchange medium through the bearing is rendered optimal by means of, for example, improved flow-through geometries. The invention described below is intended to reduce and prevent breakdowns of installations due to inadequate components of the installation that are damaged by extreme temperatures.

Particularly through the use of active coolers, such as fans, Peltier elements, or the like, direct, i.e. active, cooling is achieved without having to suffer the disadvantages entailed by the ancillary equipment when only fluid cooling is provided. Even grease-lubricated parts can be cooled directly in this way. Direct control of the cooling capacity is achieved in this case by supplying a defined current to the electrical wiring of the arrangement, according to the invention, or by applying a defined, for example, suitably controlled or suitably regulated, electrical voltage to the arrangement, according to the invention.

It is readily apparent that this thermoelectrically induced active cooling effect could be intensified by the active cooling effect of a through-flowing medium, for example, a liquid or a flowing mixture, as long as any problems relating to electrical isolation can be solved at the same time.

Active heating systems for large rolling bearings, bearings, and universal rotary joints, for machine and plant engineering that can also be used in slew drives, include any defined electrical heating system of an arrangement, or item of equipment, that operates by the suitable supply of current to heating elements.

It is further readily apparent that this thermoelectrically induced active heating effect can be intensified by the active heating effect of a through-flowing medium that is warmer than the temperature of the parts through which it flows, for example, a liquid or a flowing mixture, as long as any problems relating to electrical isolation are solved at the same time.

The problems arising from the conventional prior art can be solved successfully, in a first approximation, if, in a first stage, additional bores are sunk on the inner ring, or outer ring, of the rotary joint, or plunge cuts are provided on the periphery of the inner ring or outer ring. The purpose of these measures is to increase/improve heat removal from the rotary joint by air convection. This measure can be added as an additional cooling measure to the direct cooling measure described herein below. If, in addition to the plunge cuts extending along the periphery, an annular jacket that seals the plunge cuts flow-tightly, particularly water-tightly, is disposed around the rotary joint, then a heat exchange medium can be routed through the plunge cuts.

The solution is successful especially if the bearing (large rolling bearing, rotary joint, slew drive, etc.) is additionally provided with cooling and heating elements that are electrically powered. Heating filaments have previously been mentioned herein, but the advantageous use of thermoelectric converters, and/or the utilization of thermoelectric effects, can also be contemplated, for example in the known applied form of so-called Peltier elements, or Peltier coolers. Such heating or cooling elements can be disposed either in plunge cuts or in other material recesses, as well as in the sealing gap between the halves of the bearing, or on planar surfaces of the inner ring and/or outer ring, or, where appropriate, even in the raceways of the arrangement as a whole.

Such a thermoelectric converter is preferably based on the Peltier effect and generates a temperature difference when current flows through it, or, alternatively, a current in response to a temperature difference (Seebeck effect). If such elements are disposed on a portion, or surface, of the bearing (large rolling bearing, rotary joint, slew drive, etc.), then the same bearing (large rolling bearing, rotary joint, slew drive, etc.) can be both cooled and heated. The difference between heating, causing a defined heat input, or cooling, causing a defined heat dissipation, lies in the wiring of the electrical terminals of the thermoelectric converter. The arrangement according to the invention includes suitable wiring for the thermoelectric converter, so that, as a result, the bearing (large rolling bearing, rotary bearing, slew drive, etc.) can be either cooled or heated, for instance by reversing the direction of the current.

A further, additional stage for the removal of heat developed in the rotary joint, or bearing, is the flooding/filling of the rotary joint, or large rolling bearing (or the slew drive), with a cooling or heating medium, hereinafter referred to, for the sake of simplicity, as the medium or heat exchange medium, such as, for example, water, air, oil or a low-flammability gas mixture. For this purpose, material recesses are provided on the periphery of either the outer or the inner ring and are closed by means of a jacket-shaped component, for example a hollow part—also called a jacket part—that encases the rotary joint or the bearing. A cooling medium, to remove heat, or a heating medium, to supply heat, is routed through these material recesses (annular chambers, ring segments, annular groove, annular plunge cuts, meander-shaped tunnels, circumferential bores, etc.).

It is an option, according to the invention, to provide the circumferential surface of the overall arrangement with a plurality of circumferential material recesses, or a single spiral-like or screw-thread-like circumferential material recess. If a single circumferential material recess is provided, then the latter has at least one defined inlet location for the heat exchange medium and at least one defined outlet location for the heat exchange medium. If more than one circumferential material recess is provided, they can each be provided, in parallel and fluidically independently of one another, with a defined inlet location and an outlet location.

A preferred option is to add material recesses of this kind and additionally equip them with heating filaments, such that a heating effect—an additional such effect, where appropriate—occurs as a result of the heating effect produced by the flow of electricity. Analogously, these material recesses can also be equipped with Peltier elements.

From a practical standpoint, present-day rolling bearings, large rolling bearings, rotary joints, and rotary joints used in slew drives, do commonly have a filling bore through which the raceway system is filled with rolling elements. In terms of the present invention, that filling bore is then preferably geometrically isolated from the flow of medium, and is therefore kept apart from, and sealed against, leakage of the heat exchange medium. As an alternative, it is possible merely to dispose a channel, or a material recess, for the heat exchange medium above or below the filling bore. The heat exchange medium can be fed in, and discharged through, bores in the jacket-shaped part, the bores being referred to exemplarily above as the inlet location and the outlet location.

It is expedient for the bores to be close together, so that the flow of medium around the entire annular bearing can be made possible by placing a barrier between the bores in a simple manner, for example, by the addition of another material. The material recesses through which the medium flows annularly through the bearing can be sunk in the jacket part, and can also be configured as meander-shaped or spiral-shaped.

According to the invention, these material recesses can also be provided and be present in a plurality of annular layers, in a plurality of planes, and at different depths of penetration into the material of the large rolling bearing, bearing, rotary joint, or slew drive. These material recesses can also be present in the form of axial bores/grooves/plunge cuts.

In a further embodiment, the bearing can be provided with bores that are interconnected by connecting channels, tubes, or the like, referred to hereinafter as connecting pieces, such as to necessarily result in a through-flow through the bearing, large rolling bearing, slew drive, or the like.

These bores can advantageously also be connected to an annular material recess (groove, plunge-cut, etc.), in which the connecting pieces are inserted in such a way that they do not project beyond the planar surface of the bearing (large rolling bearing, rotary joint, slew drive, etc.), and thus are particularly well protected (since they are on the inside), and the bearing can also rest by this planar surface on the adjacent structure, which conforms geometrically to the bearing (large rolling bearing, rotary joint, slew drive, etc.), and can be attached thereto in the usual fashion, by means of screws.

In a specific embodiment, segments comprising delicate structures, produced, for example, by laser machining, and having suitable recesses or material recesses, can be added to the planar surfaces to create a defined direction of through-flow of the medium. A first plane of such segments can be configured such that two bores or flow-through holes are always connected to each other while, in a second plane, these recesses, or material recesses, are covered, so that one or more feed and discharge bores are present that channel the medium into and out of the bearing (large rolling bearing, rotary joint, slew drive, etc.).

In cases where the sole objective is to prevent excessive cooling of the bearing (large rolling bearing, rotary joint, slew drive, etc.), conventional electrical heating elements (heating filaments, heating coils, heating spirals, etc.) can be used instead of the above-cited thermoelectric converter. In contrast to the previously known art, however, it is then useful, according to the invention, if these elements are disposed in suitable recesses, or material recesses, on the circumference of a bearing ring, or, alternatively, are disposed on at least one planar surface.

BRIEF DESCRIPTION OF THE DRAWINGS

Further features, characteristics, advantages and effects based on the invention will become apparent from the following descriptions of a preferred embodiment of the invention and of additional advantageous embodiments of the invention, and by reference to the drawings. Combinations of more than one of the above-cited inventive systems are also, of course, possible. In the drawings.

DESCRIPTION OF THE PREFERRED EMBODIMENTS

Figure 1:
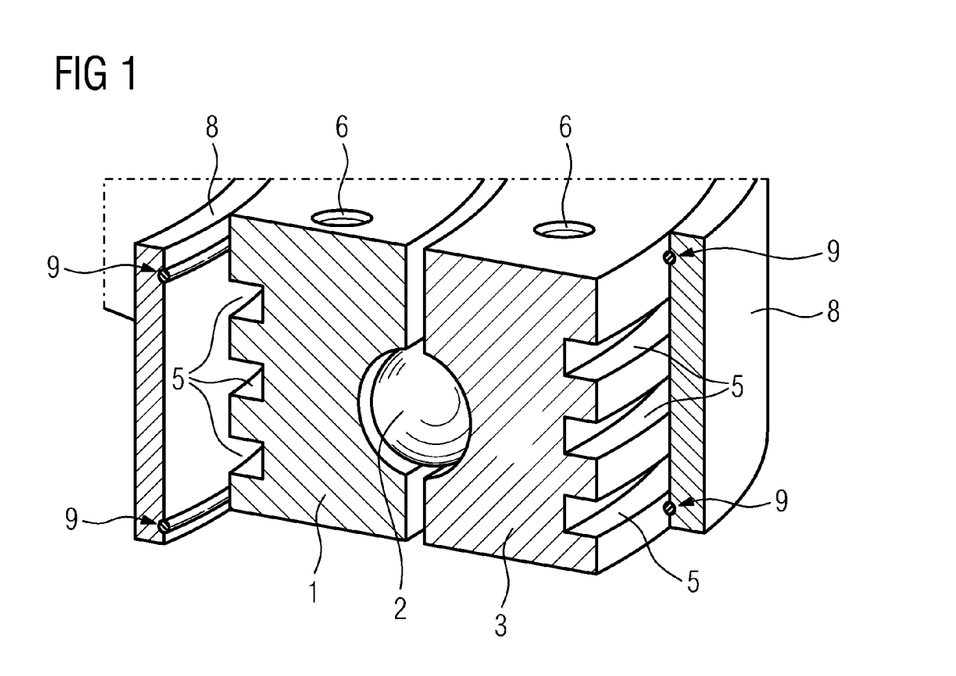
FIG. 1 is a sectional and perspective view showing an end face of a sectioned bearing or of several sectioned rotary parts (large rolling bearing, rotary joint, slew drive)

Clearly illustrated in FIG. 1 is the sectioned end face of an annular segment of a rotary joint, consisting of an outer ring 3 and an inner ring 1, and between them the raceway for the rolling elements 2, e.g. for balls with or without a rolling-element cage. Material recesses 5 sunk at the outer periphery of the inner ring 1 and the outer ring 3 are clearly visible, depicted as plunge cuts, or circumferential grooves. The heat exchange medium—air, oil, water or a low-flammability gas mixture—is able to flow through these grooves/material recesses 5. The material recesses 5 are thus configured as a flow channel, or flow channels, and are provided in an outward-facing marginal region of the outer ring 3 and an inward-facing marginal region of the inner ring 1.

This results in active or direct cooling or heating of the overall arrangement, particularly the rings 1, 3, depending on whether the temperature of the heat exchange medium is lower or higher than that of the overall arrangement.

The term "active cooling" is to be understood here as signifying in particular that a flow of a coolant, such as, for example, air, oil, water or a low-flammability gas mixture, is created by means of a fan or a pump, and cools the component that is to be cooled. For this purpose, the coolant can be routed through a heat exchanger to bring the cooling medium to an initial temperature that is lower than the temperature of the component to be cooled.

"Heating," on the other hand, should be understood to mean that the component to be heated is heated actively, for example by the heating of a heat exchange medium which heats the component to be heated, or, alternatively, by means of heating elements mounted directly on the component to be heated.

The aforesaid heat exchange medium can serve as both a cooling medium and a heating medium, depending on whether cooling or heating is being performed.

The principles of thermal conduction and forced convection, in particular, are implemented in this active cooling and active heating.

If such a heat exchange medium is used, then it must be conveyed water-tightly, or gas-tightly, or at least flow-tightly, through the flow-channel-like material recesses 5. This is readily feasible if corresponding sealing devices 9, particularly circumferential and integrally sealing seals 9, are used. The purpose of the sealing is to prevent, or at least significantly hinder, the escape of flow medium from the flow channels, for example the material recesses 5. Here, the seals 9 are each disposed in a respective groove of a jacket-shaped part 8. The respective jacket-shaped part 8 is assigned to the outer ring 3 in each case and extends along the outward-facing surface of the outer ring 3, the seals 9 resting sealingly against the outward-facing surface of the outer ring 3 and being fixed in position. Correlatively, another jacket-shaped part 8 is assigned to the inner ring 1 and extends along the inward-facing surface of the inner ring 1. The interaction of these elements, especially when the jacket-shaped parts 8 are seated firmly on the inner ring 1 and the outer ring 3, results in flow channels for conveying the heat exchange medium that are leaktight with respect to the environment.

If the jacket-shaped parts 8, implemented here as two circumferential rings 8 disposed at inner ring 1 and outer ring 3, are dispensed with, then a directed flow of heat exchange medium through the arrangement is no longer possible. This is because the material recesses 5 are the source of the indirect effect of thermal convection, since these plunge cuts 5, in combination with the circumferential surfaces of the inner ring 1 or the outer ring 3, form a cooling-fin-like geometry. In the same manner as the aforesaid material recesses 5, bores 6 in the solid material of the inner ring 1 and/or the outer ring 3 are used both to through-route a heat exchange medium and as cooling bores, in the sense of promoting better thermal convection.

Figure 2:
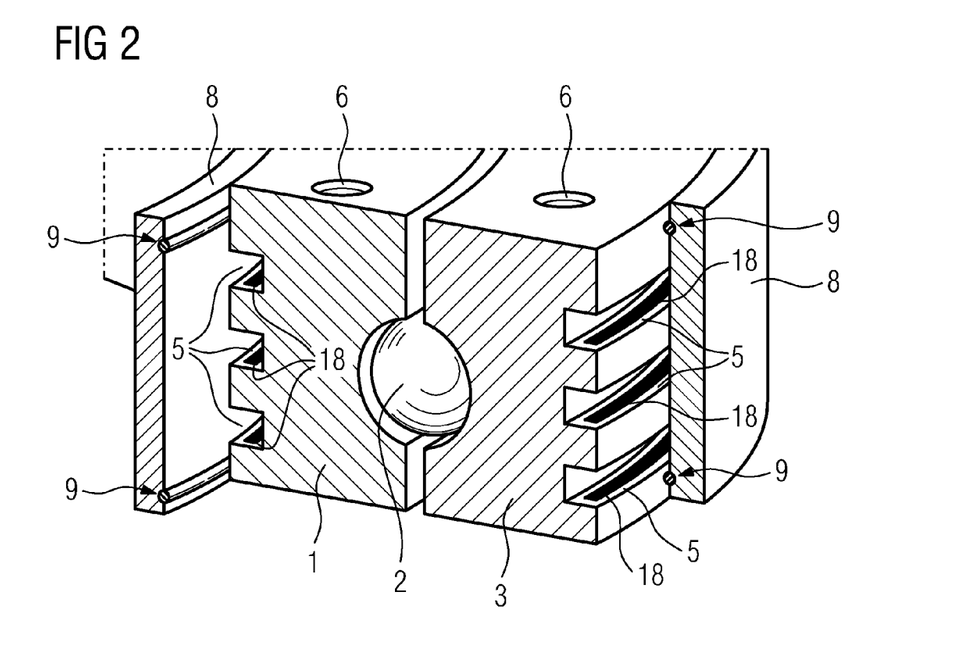
FIG. 2 is a sectional and perspective view showing the end face of a sectioned bearing or of several sectioned rotary parts (large rolling bearing, rotary joint, slew drive, etc.), with elements for direct heating or cooling inserted in the material recess.

FIG. 2 shows, by way of example, a few locations on the arrangement (bearing, rolling bearing, rotary joint, slew drive) at which elements 18 for direct cooling or heating of the arrangement can be disposed. Such elements can, in particular, be located at all points within the circumferential material recesses 5, for example, in the circumferential plunge cuts of the inner ring 1 and/or the outer ring 3, or, alternatively, inside the bores 6. The elements 18 can also, of course, rest on planar surfaces of the jacket-shaped parts 8, or against suitable surfaces of the bearing gap between the mutually rotatable rings 1 and 3.

The inventive addition of circumferential material recesses 5 to the arrangement as a whole makes it unnecessary to use upper and lower punched disks 12, 13 (FIG. 3) and upper and lower sealing plates 10, 11 to establish the preferred flow direction 16 (FIGS. 7 and 8) of the heat exchange medium. More specifically, the material recesses 5, according to FIGS. 1 and 2, are arranged in the circumferential direction, such that three parallel flow channels are formed and the heat exchange medium is routed solely in the circumferential direction.

It is also conceivable to dispose the elements 18, which, in particular, can be heating filaments or Peltier elements, or other thermoelectric converters, at the surfaces of the disks or plates 10, 11, 12, 13 delimiting the rotary joint. Given a suitable arrangement of the elements 18, it is possible to heat not only the component to be heated, i.e., the inner ring 1 and/or the outer ring 3, but also the heat exchange medium flowing through the flow channels.

Figure 3:
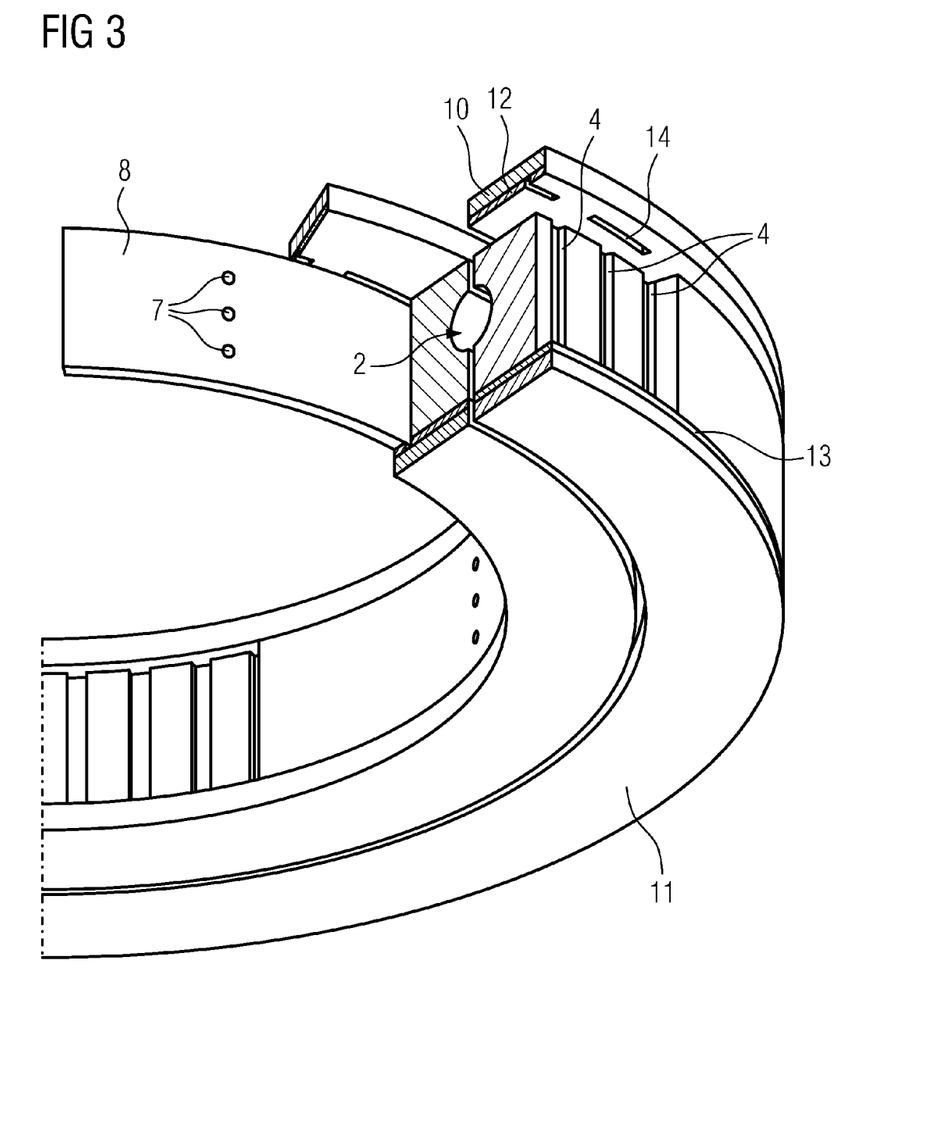
FIG. 3 is a sectional and perspective view of the end face of a sectioned bearing or several sectioned rotary parts (large rolling bearing, rotary joint, slew drive, etc.) with an adjacent jacket structure and filling bores.
Figure 4:
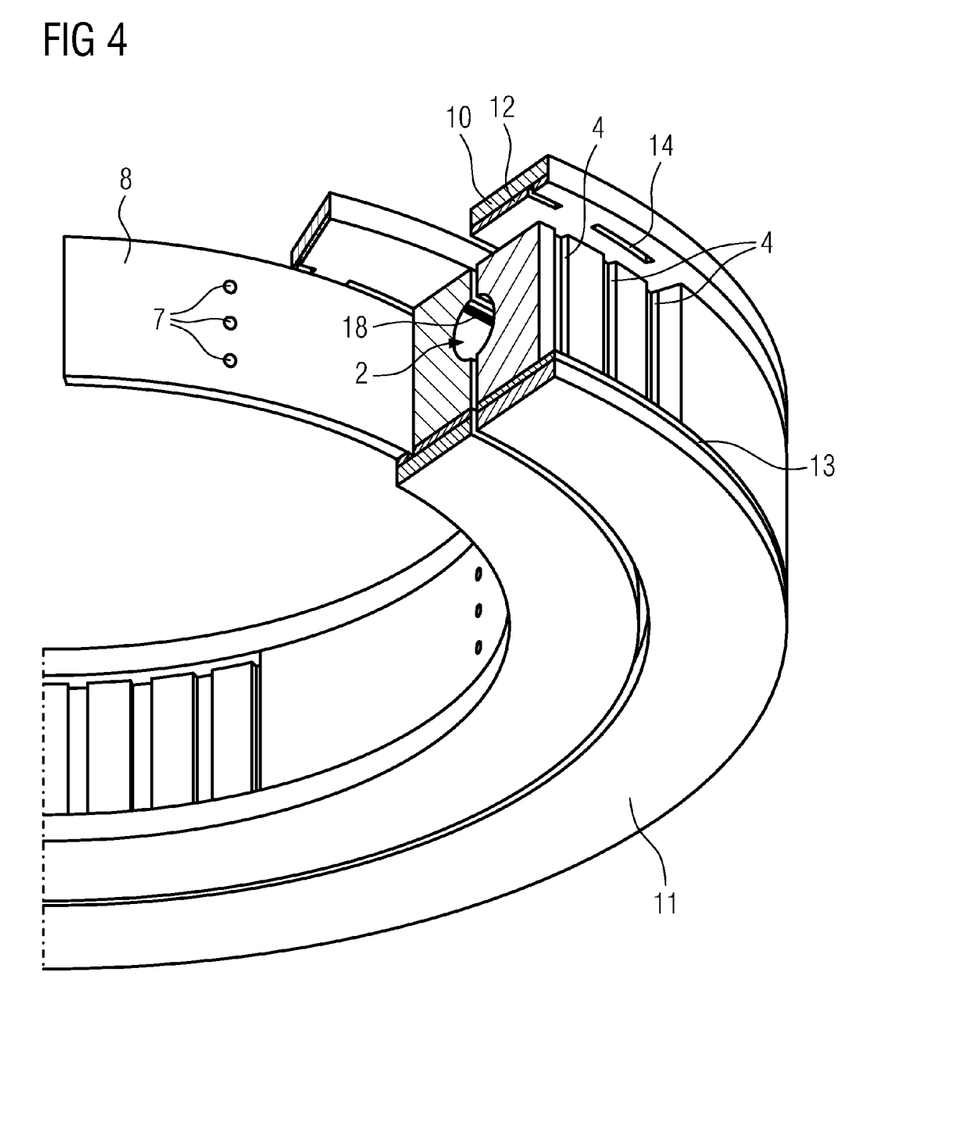
FIG. 4 is a sectional and perspective view of the end face of a sectioned bearing or several sectioned rotary parts (large rolling bearing, rotary joint, slew drive, etc.) with an adjacent jacket structure and filling bores, and with elements for direct heating or cooling disposed in the material recess or raceway.

FIGS. 3 and 4 illustrate in perspective an arrangement according to the invention of these delimiting disks or plates 10, 11, 12, 13, which can be used in particular when the material recesses serve as flow channels for a through-flowing heat exchange medium. The flow medium can be given the preferred flow direction 16 by the choice of geometry for the flow channel and by the arrangement of the material recesses 4, 5. If the inventive heating/cooling of the arrangement is effected by means of a heat exchange medium, it is necessary to keep the flow medium inside the arrangement. At defined inlet or outlet filling bores 7, the medium can leave the arrangement or pass into it, for example, into the inner ring 1 or the outer ring 3. If a pump is provided for generating a flow of heat exchange medium, then the preferred flow direction 16 is dictated by the pump direction.

Clearly apparent in FIGS. 3 and 4 are axial material recesses 4, in contrast to the circumferential material recesses 5. With the use of such axial recesses 4, which can be created, for example, by machine-milling during the production of such a ring, it is necessary to define the preferred flow direction 16 for the heat exchange medium by specifying flow-channel-like geometries. The combination of a base body, such as the inner ring 1 or the outer ring 3, with punched disks 12, 13, and sealing plates 10, 11, creates a suitable flow-channel-like geometry, as can be seen in FIGS. 3 to 8. According to the invention, a plurality of, for example, circularly circumferential flow chambers 14, 15 are present in that case and permit the through-flow of the heat exchange medium. The flow chambers 14, 15 extend in the circumferential direction and form, with the material recesses 4 extending in the axial direction, a meander-shaped or serpentine-shaped flow channel. Compared to flow channels that extend exclusively in parallel, meander-shaped or serpentine-shaped flow channels present a much greater overall length and thus a much larger wall area to be impinged upon by the heat exchange medium. A larger impinged wall area of the flow channel results in a greater cooling or heating effect, since the heat transfer capacity is directly proportional to the transfer area.

FIG. 4 shows that the elements 18 for heating or cooling can be arranged in a suitable manner on walls of the ball-bearing or rolling-bearing raceway. Such an arrangement is particularly advantageous, since cooling or heating can be incorporated immediately adjacent the location where friction arises between the rolling elements and the rings of the bearing.

Figure 5:
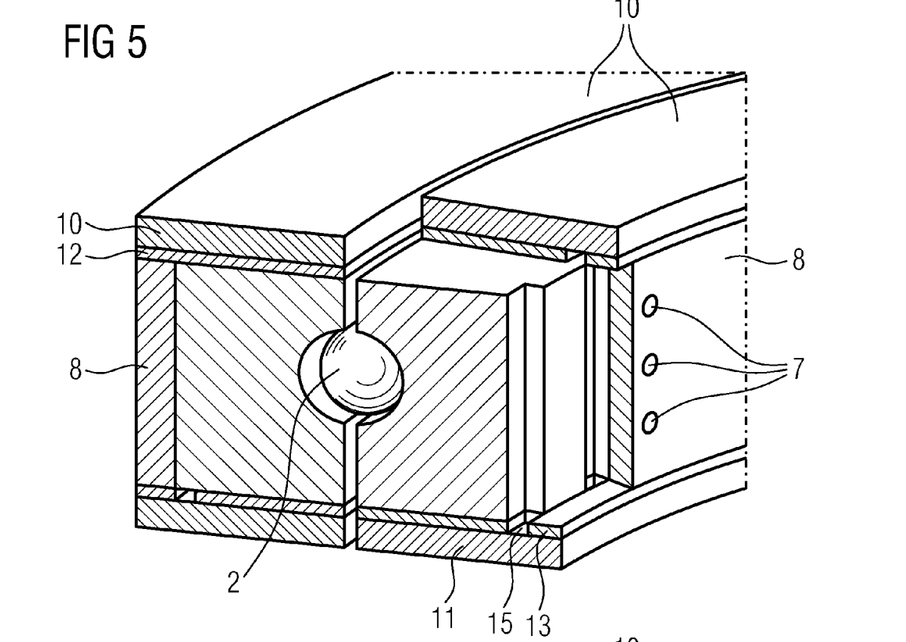
FIG. 5 is a sectional and perspective view of a sectioned bearing, e.g. inner ring or outer ring, with axially disposed material recesses, producing a flowable overall structure when combined with perforated plates and sealing plates.
Figure 6:
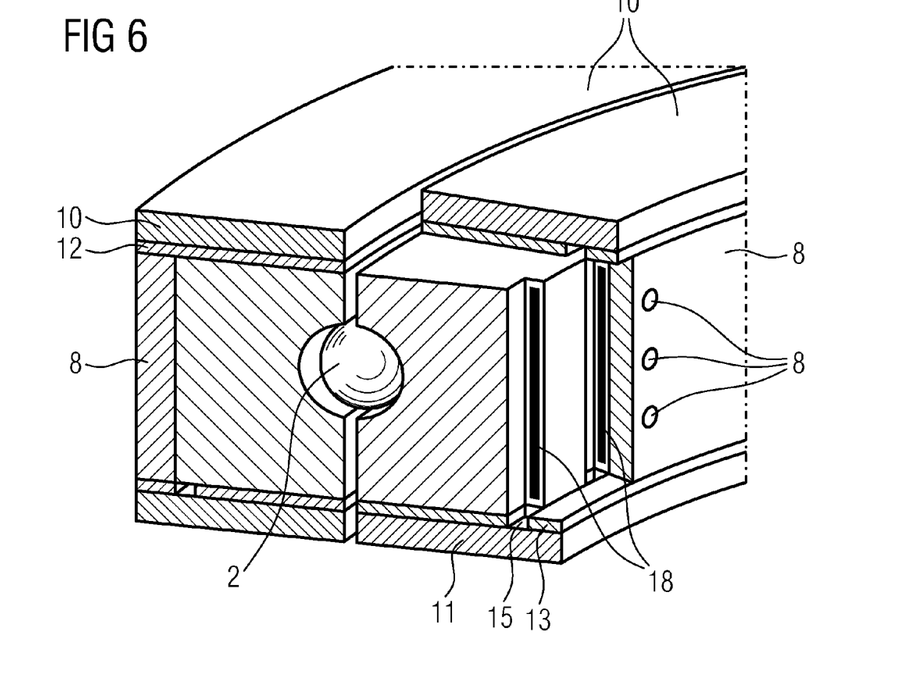
FIG. 6 is a sectional and perspective view of a sectioned bearing, e.g. inner ring or outer ring, with axially disposed material recesses, producing a flowable overall structure when combined with perforated plates and sealing plates, and with elements for direct heating or cooling inserted in the material recess.

FIGS. 5 and 6 make clear that the flow chambers are realized particularly in the form of suitable recesses in the so-called punched disks 12, 13. Such flow chambers are present according to the invention on both sides of the rings, i.e., both above inner ring 1 and outer ring 3, and below inner ring 1 and outer ring 3. Seated on each of the punched disks 12, 13 is a respective upper sealing plate 10 and a respective lower sealing plate 11. These sealing plates form a top or bottom closure for the respectively upper or lower flow chamber 14, 15 extending in the circumferential direction.

Figure 7:
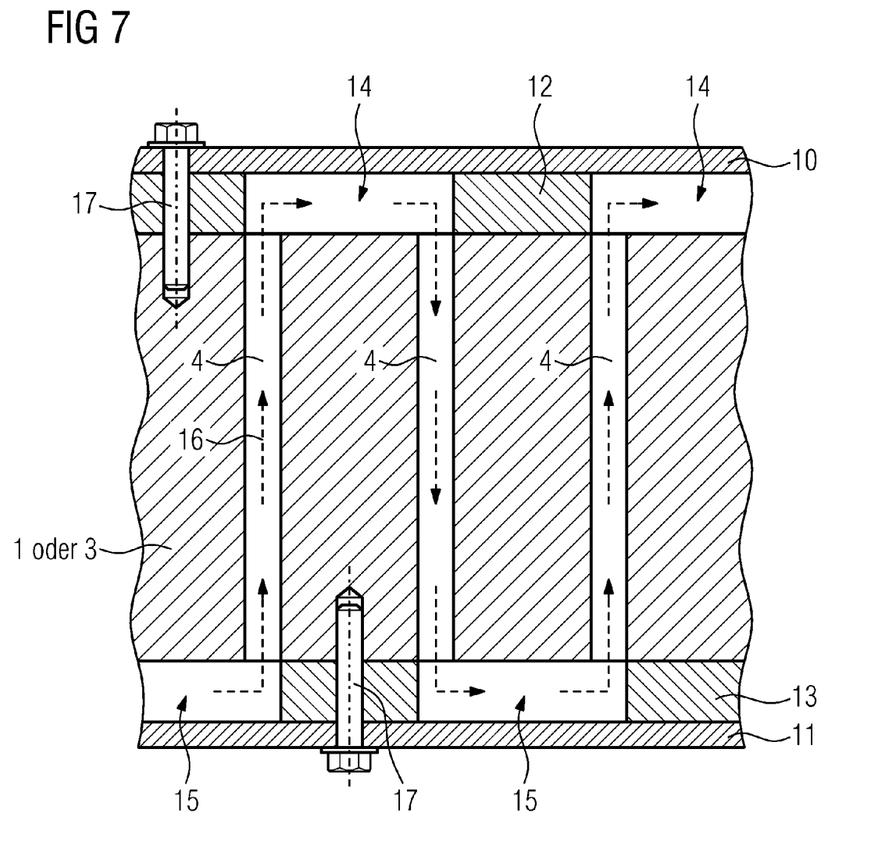
FIG. 7 is a sectional view of a sectioned bearing, e.g. inner ring or outer ring, producing a flowable overall structure when combined with perforated plates and sealing plates.

FIG. 7 is a sectioned representation of a meander-shaped or serpentine-shaped flow channel. The upper and lower sealing plates 10, 11 are each fixed via a screw connection 17, respectively, to the upper punched disk 12, or the lower punched disk 13, at one of the rings 1, 3. The axially extending flow chambers 4 are in fluidic connection with the upper and lower flow chambers 14, extending in the circumferential direction, and thus form a meander-shaped or serpentine-shaped flow channel. A flow channel of this kind presents a very large heat transfer area and is extremely leaktight at the same time. A preferred flow direction 16 is indicated.

Figure 8:
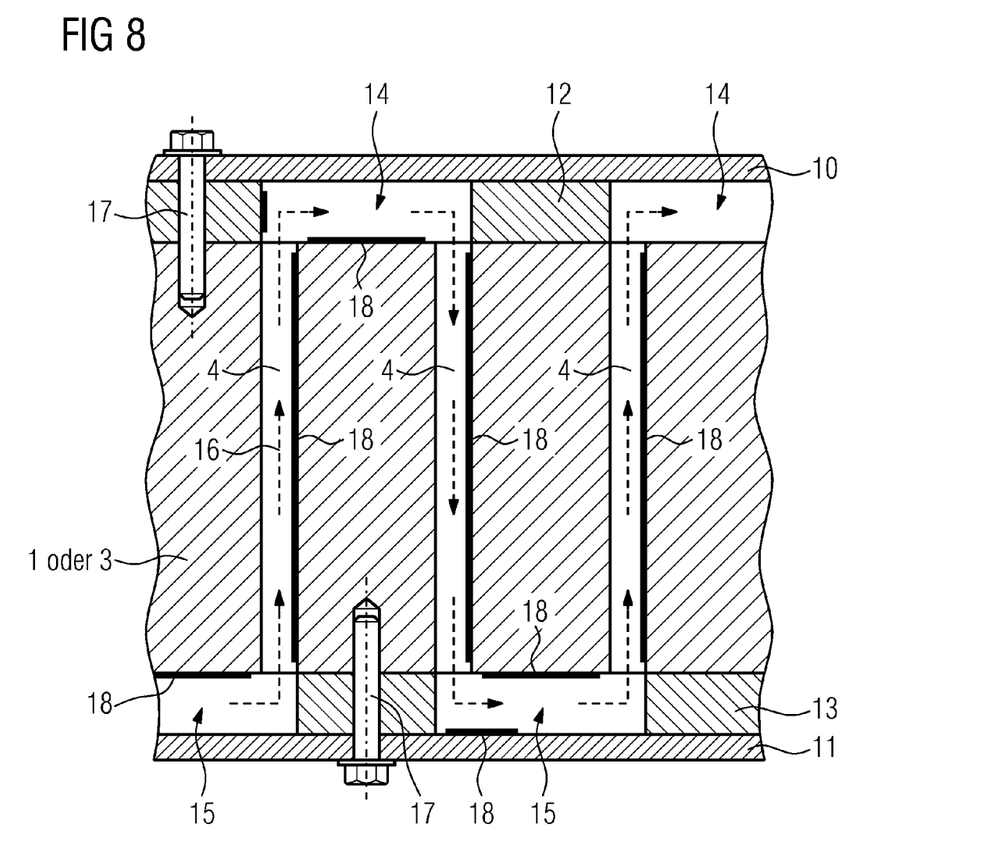
FIG. 8 is a sectional view of a sectioned bearing, e.g. inner ring or outer ring, producing a flowable overall structure when combined with perforated plates and sealing plates, and with elements for direct heating or cooling inserted in the material recess.

FIG. 8 shows a flow channel corresponding to FIG. 7, with the provision of elements for active cooling or heating. These elements are disposed particularly advantageously at the walls of the axially extending material recesses, thus permitting particularly energy-efficient cooling or heating. With this arrangement, the ring and the heat exchange medium can be cooled, or heated, at the same time, thus resulting in very high efficiency.

FIGS. 1 to 8 depict examples according to the invention for creating an overall arrangement (a bearing or rolling bearing or a rotary joint or a slew drive) with integrated cooling and/or heating. It should be noted that any one of the overall arrangements can be connected separately to further electrical wiring. It is also conceivable to connect a plurality of overall arrangements in series or in parallel to a single overall electrical wiring system. It is also conceivable to connect a plurality of such individual overall arrangements in parallel or in series to at least one flow apparatus that feeds in the heat exchange medium. Such a flow apparatus can be a fan or blower, or a fluid pump or oil pump, or another medium conveyor or fluid conveyor, for delivering a flow of cooling or heating medium to the system components.

In addition to the foregoing, it should be noted that the device according to the invention includes, besides the examples shown, any other geometry that is suitable for providing a bearing, (large) rolling bearing, rotary joint or slew drive with a through-flow of a heat exchange medium having a preferred direction, if this through-flow can serve both for direct heating and for direct cooling.

The invention claimed is:

1. A bearing assembly, comprising:
   at least two substantially annular components rotatable relative to each other about an axis of rotation;
   a plurality of rolling elements disposed between said substantially annular components, and bracing the components apart on rotation of said substantially annular components relative to each other;
   at least one material recess in at least one of said annular components, wherein the at least one material recess forms at least one section of a flow channel which permits a through-flow of a heat exchange medium comprising a selected one of water, oil, coolant, and a low-flammability gas to permit active heat supply, and/or heat removal, to and/or from, at least one of said substantially annular components, and/or said plurality of rolling elements, and/or wherein the at least one material recess houses at least one device for heating and/or cooling at least one of said substantially annular components, and/or the plurality of rolling elements, in which said device permits active heat supply, and/or heat removal, to and/or from, at least one of said substantially annular components, and/or said plurality of rolling elements, wherein one or more walls of the flow channel comprise a heat transfer surface for exchanging heat between the at least one annular component and the heat exchange medium.

2. The bearing assembly in accordance with claim 1, wherein the at least one material recess in the at least one of said annular components extends, at least in sections, in a circumferential direction.

3. The bearing assembly as in claim 1, wherein material recesses are provided substantially fully circumferentially in the circumferential direction of the at least one of said annular components; or material recesses are provided substantially fully circumferentially in the circumferential direction of the at least one of said annular components, such that substantially parallel, concentric, material recesses are provided substantially fully circumferentially in a spiral shape.

4. The bearing assembly as in claim 1, wherein at least one material recess is provided in the axial direction in the at least one of said annular components and forms the at least one section of the flow channel, such that the material recess in the axial direction is in fluidic connection with at least one material recess in a circumferential direction.

5. The bearing assembly as in claim 1, wherein a punched disk is fixed to the at least one of said annular components and forms an upper flow chamber and a lower flow chamber, such that the upper flow chamber and lower flow chamber fluidically connect to one another in a circumferential direction, and a plurality of material recesses extending in an axial direction, such that a meander-shaped or serpentine-shaped flow channel is formed.

6. The bearing assembly as in claim 1, wherein at least one upper sealing plate, and/or at least one lower sealing plate, is fixed to the at least one of said annular components and at least one jacket-shaped part is fixed to the at least one of said annular components, wherein the upper sealing plate and/or the lower sealing plate and/or the jacket-shaped part form, by means of sealing elements, a fluidic boundary of the flow channel with respect to the environment, such that the upper sealing plate, and/or the lower sealing plate, and/or the jacket-shaped part, comprise at least one filling device, and at least one filling bore, through which heat exchange medium is adapted to be fed to, and discharged from, the flow channel.

7. The assembly in accordance with claim 6, wherein the arrangement of the annular components, punched disks, and the sealing plates, is screwed together, and wherein circumferential sealing elements are adapted to keep the heat exchange medium in the arrangement in a flow-tight, water-tight, manner, as the heat exchange medium flows therethrough.

8. The bearing assembly in accordance with claim 1, wherein the temperature of the at least one of said annular components is adapted to be adjusted to a desired operating temperature as a function of the ambient temperature, or to an operating temperature adapted to a predetermined temperature of a selected lubricant.

9. The bearing assembly according with claim 1, wherein the flow direction of the heat exchange medium through the flow channel is adapted to be controlled by a controlling and/or regulating device.

10. A bearing assembly comprising a selected one of a bearing, large rolling bearing, slew drive, or rotary joint, comprising mutually rotatable components in combination with devices for integrated heating or cooling of rolling-element raceways, or of said mutually rotatable components, wherein the respective heating or cooling effect is effected by direct heat input into said components, or direct heat removal from said components, and is adapted to be controlled in a selected manner and produced by the interaction of cold- or heat-producing devices, and wherein the assembly is adapted to switch between a heating effect and a cooling effect, wherein at least one material recess is present, axially or circumferentially, in at least one of the mutually rotatable components, and permits a through-flow of a heat exchange medium.

11. The assembly in accordance with claim 10, wherein the at least one material recess is annular, or annular-chamber-shaped, or annular-segment-shaped, or annular-groove-shaped, or plunge-cut-shaped, or meander-shaped, or a combination thereof, and is disposed on a periphery of the at least one of said mutually rotatable components, or on planar surfaces thereof, or is present in a plurality of concentric planes of different diameters.

12. The assembly in accordance with claim 11, wherein the at least one material recesses comprises bores, or through-flow holes, wherein said bores or said through-flow holes, or flow chambers, are connected to one another, and in another concentric plane, the material recesses are adapted to be covered by encasing jacket-shaped parts.

13. A method for integrated heating or cooling of a bearing, large rolling bearing, slew drive, or rotary joint, each comprising respective mutually rotatable components, the method comprising the steps of:

heating or cooling by direct heat input into the components, or direct heat removal from the components, and controlling the heating or cooling by the interaction of cold- or heat-producing devices, by through-flow of a heat exchange medium, comprising a selected one of water, oil, coolant and a low-flammability gas, through at least one material recess which is provided, axially or, at least in sections, in a circumferential direction in at least one of the mutually rotatable components, and forms at least one section of a flow channel for the heat exchange medium, wherein one or more walls of the flow channel function as a heat transfer surface for exchanging heat between at least one of the mutually rotatable components and the heat exchange medium.

14. The method in accordance with claim 13, wherein a switchover between the heating effect and the cooling effect is induced by an electrical signal, or by the inversion of the electrical drive of an electrical component.

15. The method as in accordance with claim 13, wherein a switchover between the heating effect and the cooling effect is induced by a continuous or rapid increase, or decrease, in the temperature of the heat exchange medium flowing through said assembly.

16. The method in accordance with claim 13, wherein the respective heating or cooling effect is strengthened by additional indirectly heating or indirectly cooling elements disposed on surfaces of the overall arrangement, or of the mutually rotatable components, or in material recesses, or in a bearing gap, or in bores.

17. The method for integrated heating or cooling of the bearing, large rolling bearing, slew drive or rotary joint in accordance with claim 13, wherein the through-flow of the heat exchange medium is provided in plural concentric planes around an axis of rotation of the assembly, wherein at least one defined inlet is present for the inflow of the heat exchange medium into the arrangement, the inlet comprising at least one filling bore sunk into a jacket surface, and wherein at least one outlet is present for outflow of the heat exchange medium from the assembly, the outlet comprising at least one outlet bore disposed in the jacket surface.

\* \* \* \* \*